United States Patent Office 3,666,482
Patented May 30, 1972

1 2

3,666,482 GELLED ALCOHOL-CONTAINING COMESTIBLE

Sol B. Wiczer, 3235 Sleepy Hollow Road, Falls Church, Va. 22042

No Drawing. Substituted for abandoned application Ser. No. 233,190, Oct. 22, 1962. This application Jan. 15, 1968, Ser. No. 697,623
Int. Cl. C12g 3/00
U.S. Cl. 99—30 3 Claims

ABSTRACT OF THE DISCLOSURE

Comestible product comprising a gelated beverage of highly alcoholic content and having a protective casing about the gel.

This application is a substitute for Ser. No. 233,190, filed Oct. 22, 1962 and now abandoned. The invention relates to an improved confection including an alcoholic beverage, comprising substantially a gelated potable alcoholic beverage encased in an alcohol-impervious container or sheath, all components of which are edible.

According to the present invention an alcoholic beverage containing a substantial quantity of alcohol is converted to a solid edible confection. Such beverage preferably ranges from about 25 to 75% alcoholic content, that is a beverage of approximately 50 to 150 proof, typically a well-aged whiskey of the nature of bourbon, scotch, rye or conventional blended whiskies, usually commercially available as 80 to 100 proof whiskies, or strong rums, brandies, fortified wines, mixed drinks including strong cocktails, cordials and the like. Such beverage is first gelated with methyl cellulose as an edible gelating agent. The soft deformable gelated product is then encased in an edible casing comprising an alcohol precipitatable carbohydrate.

The carbohydrate component is typically a gum or gum component such as a sugar acid which is precipitated by alcohol. The precipitated component of the gum is a polyuronic acid or salt thereof. Such gums are of an edible character, usually occurring as natural gums, which contain the polyuronic acid or salts thereof. The polyuronides naturally occur in all gums, and these are usually a mixture of calcium salts with some magnesium and potassium salts of mannuronic, glucuronic or galacturonic acids combined with glycosidal residues with which they naturally occur in the form of the high molecular weight sugar acid polymers. Pure polyuronides may be derived by alcohol precipitation from such natural edible gums as aloe, gum guar, quince seed gum, wild cherry gum, karaya, peach gum, gum ghatti, acacia, tragacanth, algin, psyllium seed, and the like. Thus, I prefer to use any naturally occurring edible gum or gum mixture which contains substantial quantities of polyuronides or other alcohol precipitatable edible components; or I can first dissolve a highly water soluble natural gum in water and preliminarily precipitate the polyuronide salt therefrom by treating the aqueous gelatinous gum solution with sufficient alcohol to precipitate the polyuronide salts. This may be done by merely converting the total aqueous suspending medium to at least 25% alcohol, and preferably as high as 80% alcohol, whereby the polyuronide salts precipitate. The precipitated polyuronides may be removed by first decanting the supernatant precipitating alcoholic liquor, filtering, drying and powdering the dry polyuronide precipitate. Where the natural gum contains large quantities of polyuronide, and is directly edible, such as gum guar or aloe gel, there is no need to precipitate the polyuronides, and the natural gum product may be used as the dried and powdered gum as it occurs without substantial further purification after separation from the plant and drying.

The gelated alcoholic beverage may be given an outer coating of the alcohol precipitatable gum merely by dusting the gum coating on the gel to form a protective outer layer of the polyuronide-containing gum, so that the center of the coated beverage product is soft and gelatinous like a gum drop; but it, nevertheless, does not exude the alcoholic liquid until it is severed by biting or cutting it open, exhibiting only a homogeneous wet alcoholic gel interior.

Since the original potable beverage has its own natural color and flavor, it may be undesirable to add additional flavoring or coloring agents to the white methyl cellulose, or even to the outer coating layer of white powdered polyuronide or gum containing it. Nevertheless, it is within the scope of this invention to add additional flavoring and coloring agents to any or all of the components; that is, to the beverage, the methyl cellulose gelating agent, or to the outer alcohol precipitatable coating as may be desired. It is also possible for improved appearance as well as taste, after first coating of the gelated interior with the gum, to seal in the alcoholic liquor, to then further apply another outer coating of starch, sugar, nut crumbs, etc., to impart an improved non-tacky feel so that the product may be handled without tackiness.

The polyuronide and the gums which contain it are soluble in water and form thick slurries or gels in water when added to water in the range of about 1 to 5%. It is possible to form a thick gel of the polyuronide or the gum and cast it into a container-like form, removing the water to harden the body thereof to an alcohol-impervious casing into which the beverage alcohol gel is then filled as a soft center. After such filling, a similarly hardened cover may be applied and then sealed to the casing, using a trace of water to bind the two sections together, the small moistening thus making the contiguous parts sufficiently gelatinous to adhesively seal together as a closed container. Alternately, the alcoholic beverage gelated center can have polyuronide powder dusted over the top of the pre-cast sides to complete the seal.

Various manipulative methods of forming casings from alcohol precipitatable substances and encapsulating the gelatinous alcoholic beverage therein as known in the confectionary art may be applied here within the spirit of this invention. While it is preferred, as stated, to use an alcohol-insoluble casing, the edible solidified alcohol can be placed in a non-edible container from which only the content are eaten, and the container per se disposed of otherwise.

EXAMPLE I

A commercial 100 proof bottled in bond bourbon whiskey is first gelated by adding dry flakes of 4000 cps. methyl cellulose in quantity of 5% of methyl cellulose, the remainder being whiskey, on a weight-volume basis (5 gr. methyl cellulose per 100 cc. of beverage). The mixture is agitated in the cold for a minute or two until the gel forms as a thick non-fluid, but readily deformable gel, which exhibits no syneresis on standing. About 5 cc.'s of the gel are then rolled in a dried powder of aloe gel, as it naturally occurs from scrapings of the gel interior of the aloe leaf of the aloe plant such as aloe vera. The dusted gelated product is dry to the touch and soft as a gum drop and may be packaged as a confection and stored for several months at ambient temperatures. It is preferred that the product be placed in large tins or paper-board boxes for storage to maintain it "fresh" as ordinary confections such as chocolate candies are usually handled and stored.

EXAMPLE II 86 proof scotch whiskey is gelated as in Example I with 7% on a weight volume basis of 4000 cps. methyl cellulose, merely mixing in the methyl cellulose flakes into the liquid whiskey to form a firm, homogeneous gel at ambient temperatures. This thick gel is then filled into cup-like containers formed by casting slightly moistened powdered gum guar, which was pressed in a mold and dried to form the container. After filling the container with the gelated center, the open top is dusted with more gum guar.

EXAMPLE III

The container shell described in the preceding Example II, before filling with the alcoholic beverage gel, has its outer surface sprayed with a hot syrup of ordinary sugar and water, the sugar being in sufficiently high concentration to form a dry crystal sugar coating on the container shell on cooling, the spray being light enough to prevent substantial penetration of the gum guar shell. In this manner an outer sugar casing is formed, imparting a sweetened taste to the gum shell.

EXAMPLE IV

In an alternate procedure to that of Example III, the alcoholic gel is first filled into the casing, covered with another covering shell, sealed with a trace of moisture at its edges, and the entire enclosed product is then finely sprayed with a hot crystallizable sugar solution which cools and freezes to a sugar coating upon contact with the beverage-filled gum shell.

EXAMPLE V

Carbohydrate particles consisting of cooked farina are dipped in a 2% gel of polycalcium gluco-manno-polyuronide (the purified gel formed by alcohol precipitation of a gel derived by scraping of the gel from the leaves of aloe vera plant—see detailed description in Roboz et al., J. Amer. Chem. Soc., Vol. 70, pg. 3248). The gel moistened farina is cast in a mold shaped to a small cup-like body, dried and removed from the mold. It is thereafter filled with the edible alcohol gel formed as in Example I, coated with a thick layer of calcium polyuronide wetted farina and dried in air.

EXAMPLE VI

Edible alcohol such as creme de menthe cordial is mixed in quantity of about 85% by volume with a solidifying agent which is alternately (a) methyl cellulose, (b) gelatin, or (c) mixtures thereof. The gelated beverage an also (d) be mixed with whipped cream to impart a creamy taste.

Various modifications will occur to those skilled in the art. While methyl cellulose is preferred for gelating the alcohol beverage, other strong alcoholic beverage gelatable gelating agents may be used if they are edible. Similarly, while I prefer polyuronides and natural gums containing them, other alcohol precipitatable edible casing substances may be used. The alcohol precipitatable gums may be mixed with sugars or other starchy products, or any edible solids, preferably carbohydrate, and used as a coating or casing about the gelated liquid alcoholic beverage. The coated edible alcohol product may be stored in the open air. However, it is preferred to package them separately as a product similar to chocolate candies in an air-tight package such as metal, plastic or cardboard boxes.

I claim:

1. A solid comestible product comprising a 50 to 150 proof alcoholic beverage liquid gelated to a substantially solid pressure deformable gel form with edible methyl cellulose, said gel being enclosed in an edible film consisting of alcohol precipitatable natural gum.

2. A solid comestible product as defined in claim 1 wherein said precipitatable gum is a polyuronide.

3. A solid comestible product as defined in claim 2 wherein the polyuronide is selected from the group consisting of gum guar and dry aloe gel.

References Cited

UNITED STATES PATENTS

| | | | |
|---|---|---|---|
| 2,113,596 | 4/1938 | Lilienfeld | 99—30 |
| 2,537,453 | 1/1951 | Frangialli | 99—78 |
| 2,778,737 | 1/1957 | Du Bridge | 99—129 |
| 2,821,477 | 1/1958 | Forkner | 99—129 |

FOREIGN PATENTS

| | | |
|---|---|---|
| 326,447 | 3/1930 | Great Britain. |

OTHER REFERENCES

Whistler, R. L., Industrial Gums, Academic Press, N.Y., 1959 (pp. 565, 566, 579–581 and 585).

LIONEL M. SHAPIRO, Primary Examiner

D. M. NAFF, Assistant Examiner

U.S. Cl. X.R.

99—129, 134 R